United States Patent [19]

Schimmel et al.

[11] Patent Number: 5,229,095

[45] Date of Patent: Jul. 20, 1993

[54] PROCESS FOR PRODUCING AMORPHOUS SODIUM SILICATE

[75] Inventors: Günther Schimmel; Michael Kotzian, both of Erftstadt; Herbert Panter, Hürth; Alexander Tapper, Monchen-Gladbach, all of Fed. Rep. of Germany

[73] Assignee: Hoechst Aktiengesellschaft, Frankfurt am Main, Fed. Rep. of Germany

[21] Appl. No.: 839,008

[22] Filed: Feb. 14, 1992

Related U.S. Application Data

[63] Continuation of Ser. No. 595,434, Oct. 11, 1990, abandoned.

[30] Foreign Application Priority Data

Oct. 25, 1989 [DE] Fed. Rep. of Germany ....... 3935464
Feb. 15, 1990 [DE] Fed. Rep. of Germany ....... 4004625

[51] Int. Cl.$^5$ ............................................. C01B 33/32
[52] U.S. Cl. ...................................... 423/334; 423/332
[58] Field of Search ....................... 423/332, 333, 334

[56] References Cited

U.S. PATENT DOCUMENTS

| | | | |
|---|---|---|---|
| 1,517,891 | 12/1924 | Dickerson | 423/332 |
| 3,471,253 | 10/1969 | Shaver | 423/332 |
| 3,835,216 | 9/1974 | Almagro et al. | 423/332 |
| 4,676,953 | 6/1987 | Jeromin et al. | 422/106 |
| 4,776,866 | 9/1988 | Christophliemk | 423/334 |

FOREIGN PATENT DOCUMENTS 0293640 9/1988 European Pat. Off. .
3718350 12/1988 Fed. Rep. of Germany .
2157943 8/1973 France .

OTHER PUBLICATIONS

Chemical Abstracts, 236101V, 1989.

*Primary Examiner*—Olik Chaudhuri
*Assistant Examiner*—Ken Horton
*Attorney, Agent, or Firm*—Connolly and Hutz

[57] ABSTRACT

A process for producing amorphous sodium silicates having a water content of 0.3 to 6% by weight and an $SiO_2/Na_2O$ molar ratio of (1.9 to 2.8) : 1 from a water-glass solution containing at least 20% by weight of solids, the water-glass solution is obtained by reacting quartz sand with sodium hydroxide solution at an $SiO_2/Na_2O$ molar ratio of (2.0 to 2.8) : 1 at temperatures of 180 to 240° C. and pressures of 10 to 30 bar. This waterglass solution is treated in a spray-drying zone with hot air at 200 to 300° C. for a residence time of 10 to 20 seconds and at a temperature of the exit gas leaving the spray-drying zone of 90° to 130° C., to form a pulverulent amorphous sodium silicate having a water content (determined as the loss on ignition at 700° C.) of 15 to 23% by weight and a bulk density of more than 300 g/l. The pulverulent sodium silicate is introduced into an obliquely arranged rotary kiln fitted with devices for moving solids and treated therein with flue gas in countercurrent at temperatures from 250° up to 500° C. for 1 to 60 minutes. The rotary kiln is here insulated in such a way that its outside wall temperature is less than 60° C. Finally, the amorphous sodium silicate emerging from the rotary kiln is comminuted by means of a mechanical crusher to grain sizes of 0.1 to 12 mm.

8 Claims, No Drawings

PROCESS FOR PRODUCING AMORPHOUS SODIUM SILICATE

This application is a continuation, of application Ser. No. 07/595,434 filed Oct. 11, 1990, now abandoned.

FIELD OF THE INVENTION

The present invention relates to a process for producing amorphous sodium silicates having a water content of 0.3 to 6 percent by weight, preferably of 0.5 to 2 percent by weight, and an $SiO_2/Na_2O$ molar ratio of (1.9 to 2.8) : 1 from a waterglass solution containing at least 20 percent by weight of solids.

BACKGROUND AND PRIOR ART

From U.S. Pat. No. 3,471,253, it is known to obtain a waterglass solution by introducing 42 percent by weight sodium hydroxide solution and sand (silica) in a weight ratio of about 2 : 1 into a stirred autoclave and allowing the mixture to remain therein for 3 hours at 210° C. and 16 bar. The hot sodium silicate solution taken out after cooling of the autoclave content to 85° C. contains, after excess sand and other impurities have been filtered off, 57.5% of solids and has an $SiO_2/Na_2O$ ratio of 1.64 : 1.

Crystalline sodium silicates having a layer structure and an $SiO_2/Na_2O$ molar ratio of (1.9 to 3.5) : 1 are produced by the process according to German Offenlegungsschrift 3,718,350 by treating waterglass solutions having a solids content of 20 to 65 percent by weight in a spray-drying zone to form a water-containing amorphous sodium silicate, the exit gas flowing out of the spray-drying zone having a temperature of at least 140° C. The water-containing amorphous sodium silicate is heat-treated in an ignition zone for 1 to 60 minutes at 500° to 800° C. in the presence of at least 10 percent by weight of recycle material, which was obtained by mechanical comminution of crystalline sodium silicate previously discharged from the ignition zone.

A disadvantage in the last mentioned process is that the material obtained in spray-drying takes up a large volume because of its low bulk density of 100 to 250 g/l and generates a lot of dust. Moreover, the use of recycle material during the heat treatment causes considerably greater expense on equipment and, because of the higher throughput of material, requires a rotary tube of greater dimensions.

SUMMARY OF THE INVENTION

According to the invention, the said disadvantages in the production of amorphous sodium silicates from a waterglass solution containing at least 20% by weight of solids are overcome by a) obtaining the waterglass solution by reacting quartz sand with sodium hydroxide solution in an $SiO_2/Na_2O$ molar ratio of (2.0 to 2.8) : 1 at temperatures from 180° to 240° C. and pressures from 10 to 30 bar, b) treating the waterglass solution in a spray-drying zone with hot air at 200° to 300° C. for a residence time of 10 to 25 seconds and at a temperature of the exit gas leaving the spray-drying zone of 90° to 130° C., to form a pulverulent amorphous sodium silicate having a water content (determined as the loss on ignition at 700° C.) of 15 to 23% by weight and a bulk density of more than 300 g/l, c) introducing the pulverulent sodium silicate according to b) into an obliquely arranged rotary kiln fitted with devices for moving solids and treating it therein with flue gas in counter-current at temperatures from 250° up to 500° C. for 1 to 60 minutes, the rotary kiln being insulated in such a way that its outside wall temperature is less than 60° C., and d) comminuting the amorphous sodium silicate emerging from the rotary kiln by means of a mechanical crusher to grain sizes of 0.1 to 12 mm.

DESCRIPTION OF THE PREFERRED EMBODIMENTS

Furthermore, the process according to the invention can, if desired, also be further developed by aa) grinding the comminuted sodium silicate by means of a mill to grain sizes of 2 to 400 μm;

bb) using a mechanical mill running at a circumferential speed of 0.5 to 60 m/second;

cc) using an air jet mill;

dd) using a ceramically lined ball mill;

ee) using a ceramically lined vibratory mill;

ff) extracting the exit gas from the rotary kiln in the central region thereof and in the region of the end where the pulverulent amorphous sodium silicate having a water content of 15 to 23% by weight is introduced, and purifying the exit gas by means of a dry dust filter, the sodium silicate taken from the dry dust filter being quasi-continuously admixed to the pulverulent amorphous sodium silicate destined to be introduced into the rotary kiln;

gg) feeding the ground sodium silicate to a roll compactor, by means of which it is compressed at a rollpressing force of 20 to 40 kN/cm of roll width to give compact pieces;

hh) processing the compact pieces, after pre-comminution by forcing them through screens, to give granules having a bulk density of 700 to 1000 g/l.

Sodium silicates can be used as water-softening agents.

In the process according to the invention, a sodium silicate of high bulk density which can readily be handled, is obtained owing to the low temperature and the short residence time in the spraying of the waterglass solution.

Due to the low heat transfer through the wall of the rotary kiln because of its good insulation, the tendency of the sodium silicate to stick is counteracted in the process according to the invention.

In the process according to the invention, the use of a low-speed mechanical mill (for example a disk mill, beater mill, hammer mill or roll mill) is necessary in order to avoid abrasion of iron from the grinding tools.

If a ceramically lined ball mill or a vibratory mill or an air jet mill for very fine products, i.e. those having diameters of 6 to 10 μm is used in the process according to the invention, likewise no contamination of the sodium silicate due to metal abrasion occurs.

In the process according to the invention, the dust loading in the exit gas is considerably reduced by the simultaneous extraction of dust-containing exit gas in the central region of the rotary tube and in the region of its charging end, because dust is released above all during charging of the sodium silicate to the rotary kiln and because the gas velocity is reduced in the region where the amorphous, water-containing sodium silicate is charged.

Using the process according to the invention, an abrasion-resistant granulated product, which very quickly disintegrates in water, is obtained by compacting.

The residual hardnesses indicated in Examples 2 and 3 were determined by the following procedure:

2.5 g of sodium silicate were suspended in 1000 ml of tap water of 18° German hardness (corresponds to a content of 85 mg of Ca and 15 mg of Mg per liter). The suspension was stirred for 30 minutes at 60° C. by means of a magnet stirrer at about 500 rpm. After rapid cooling in ice water to 20° C., the suspension was filtered through a membrane filter (pore width: 0.45 μm). The calcium and magnesium contents in the clear filtrate were determined by means of atomic absorption.

EXAMPLE 1

According to the State of the Art

In a hot-air spray tower (exit gas temperature: 145° C.), amorphous sodium disilicate having a loss on ignition of 19% at 700° C. and a bulk density of 220 g/l was produced from a waterglass solution having a solids content of 45%.

60 kg/hour of amorphous sodium disilicate having a water content (determined as the loss on ignition at 700° C.) of 18% by weight and 15 kg/h of a recycle material, which had been obtained by comminution of a product, obtained in a previous batch, to less than 250 μm, were charged via a metering screw to a directly fired rotary kiln (length: 5 m; diameter: 78 cm; inclination: 1.2°) at its end opposite the flame, while the crystalline product was discharged from the flame side. The temperature at the hottest point in the rotary kiln was 740° C.

No material sticking to the wall of the rotary kiln was formed; the discharged sodium disilicate was largely pulverulent.

EXAMPLE 2

According to the Invention

Sand (99 percent by weight of $SiO_2$; grain size 90% <0.5 mm) and 50 percent by weight sodium hydroxide solution in an $SiO_2/Na_2O$ molar ratio of 2.15 : 1 were filled into a nickel-lined cylindrical autoclave fitted with a stirrer device. With the autoclave being stirred, the mixture was heated to 200° C. by injecting steam (16 bar) and held for 60 minutes at this temperature. The content of the autoclave was then let down through a flash vessel into a tank and, after the addition of 0.3% by weight of perlite as a filter aid, filtered at 90° C. through a disk pressure filter to separate off the insoluble matter. As the filtrate, a clear waterglass solution having an $SiO_2/Na_2O$ molar ratio of 2.04 : 1 was obtained. The solids content was adjusted to 50% by dilution with water.

The waterglass solution was sprayed in a hot-air spray tower which was fitted with a disk atomizer and which was heated via a gas-fired combustion chamber and connected to a pneumatically cleaning hose filter for precipitating the product, the combustion chamber having been adjusted in such a way that the hot gas entering at the tower top had a temperature of 260° C. The rate of the waterglass solution to be sprayed was adjusted such that the temperature of the silicate/gas mixture leaving the spray tower was 105° C. The residence time was calculated to be 16 seconds from the volume of the spray tower and the gas throughput through the spray tower. The amorphous sodium disilicate precipitated on the hose filter had, at a low dusting tendency, a bulk density of 480 g/l, an iron content of 0.01% by weight, an $SiO_2/Na_2O$ ratio of 2.04:1 and a water content (determined as the loss on ignition at 700° C.) of 19.4%; its mean particle diameter was 52 μm.

The rotary kiln described in Example 1 had been insulated by several plies of mineral wool and a sheet metal jacket in such a way that, at a temperature of 390° C. in the interior of the rotary kiln, a maximum temperature of 38° C. occurred on its outer skin. 60 kg of the amorphous sodium disilicate were introduced per hour into this rotary kiln, no sticky material being formed. The amorphous sodium disilicate ($Na_2Si_2O_5$) leaving the rotary kiln and showing a water content of 0.7% by weight (determined as the loss on ignition at 700° C.) was comminuted by means of a mechanical crusher to a grain size of less than 6 mm and, after intermediate cooling, ground on a disk mill (diameter: 30 cm) at 400 $min^{-1}$ to a mean particle diameter of 95 μm, the iron content of the ground product being identical to that of the sodium disilicate introduced into the rotary kiln.

The exit gas from the rotary kiln was extracted in the region where the amorphous sodium disilicate having a water content (determined as the loss on ignition at 700° C.) of 19.4% by weight was introduced, and fed to a scrubbing tower. 3 kg of sodium disilicate per hour were discharged with the exit gas.

The residual hardness of the sodium disilicate thus produced was 2.5 mg/l of Ca and less than 1 mg/l of Mg.

EXAMPLE 3

According to the Invention

Example 2 was repeated with the modification that the temperature was 300° C. in the interior of the rotary kiln and 35° C. on its outer skin. The amorphous sodium disilicate leaving the rotary kiln here had a water content (determined as the loss on ignition at 700° C.) of 5% by weight. The residual hardness of the sodium disilicate produced in this way was 3.5 mg/l of Ca and 1.5 mg/l of Mg.

EXAMPLE 4

According to the Invention

The product obtained according to Example 2 having a mean particle diameter of 95 μm was further comminuted by means of a fluid-bed opposed jet m{11 with an integrated mechanical classifier device. Depending on the set speed of rotation of the classifier, an attrition-free sodium disilicate having a mean particle diameter of 2 to 15 μm was obtained.

EXAMPLE 5

According to the Invention

The product obtained according to Example 2 was further comminuted by means of a porcelain-lined ball mill filled with corundum balls. An attrition-free sodium disilicate having a mean particle diameter of 5 to 14 μm, depending on the grinding time, was obtained.

EXAMPLE 6

According to the Invention

The product obtained according to Example 2 was processed in a roll compactor having a pressing force of the compacting rolls of 30 kN/cm of roll width with subsequent comminution of the flakes in a screen granulator to give dust-free granules having a mean particle diameter of 900 μm, a bulk density of 870 g/l and a high abrasion resistance.

For the determination of the abrasion resistance, 50 g of granules are treated in a rolling ball mill (length: 10 cm; diameter: 11.5 cm; 8 steel balls of 2 cm diameter) for 5 minutes at a speed of rotation of 100 min$^{-1}$.

After the abrasion test had been carried out, the mean particle diameter was still 720 μm, which corresponds to a decrease of 20%.

EXAMPLE 7

According to the Invention

Example 2 was repeated with the modification that the exit gas from the rotary kiln was extracted at two points, namely, apart from the region where the amorphous sodium disilicate having a water content of 19.4% by weight is introduced, additionally at a point in the rotary kiln which was at a distance of about 2 m from the said introduction region in the direction of the rotary tube axis. The two exit gas streams were combined and the solids contained therein were precipitated by means of a heat-resistant hose filter. The precipitated solids were re-introduced into the rotary kiln together with the amorphous sodium disilicate having a water content of 19.4% by weight, so that no sodium disilicate was lost. As a result, the throughput of the rotary kiln rose to 70 kg/hour, but nevertheless there was no sticky material in the interior of the rotary kiln.

EXAMPLE 8

Comparison Example

Example 2 was repeated with the modification that the hot gas entering at the top of the hot-air spray tower had a temperature of 330° C. The temperature of the silicate/gas mixture leaving the spray tower was 140° C. The sodium disilicate precipitated on the hose filter had a bulk density of 250 g/l, a water content (determined as the loss on ignition at 700° C.) of 17.9% by weight and a mean particle diameter of 60 μm. This sodium disilicate was very dusty.

EXAMPLE 9

Comparison Example

Example 2 was repeated with the modification that the rotary kiln was insulated only in such a way that, at a temperature of 490° C. in the interior of the rotary kiln, a maximum temperature of 150° C. occurred on its outer skin. As a result, large areas of sticking material formed on the inner wall of the rotary kiln, which frequently had to be knocked off mechanically. From the rotary kiln, a product was discharged, some of which had the size of footballs and was very difficult to comminute by the mechanical crusher.

EXAMPLE 10

Comparison Example

Example 2 was repeated with the modification that the sodium disilicate comminuted by means of the mechanical crusher was ground to a mean particle diameter of 83 μm, using an impact disk mill at 10,000 min$^{-1}$. The ground product had a gray tinge and showed an iron content of 0.02% by weight.

We claim:

1. A process for producing amorphous sodium silicates having a water content of 0.3 to 6% by weight and an SiO$_2$/Na$_2$O molar ratio of (1.9 to 2.8) : 1 from a waterglass solution containing at least 20% by weight of solids, which comprises
   a) obtaining the waterglass solution by reacting quartz sand with sodium hydroxide solution in an SiO$_2$/Na$_2$O molar ratio of (2.0 to 2.8) : 1 at temperatures from 180° to 240° C. and pressures from 10 to 30 bar,
   b) treating the waterglass solution in a spray-drying zone with hot air at 200° to 300° C. for a residence time of 10 to 25 seconds and at a temperature of the exit gas leaving the spray-drying zone of 90° to 130° C., to form a pulverulent amorphous sodium silicate having a water content (determined as the loss on ignition at 700° C.) of 15 to 23% by weight and a bulk density of more than 300 g/l,
   c) introducing the pulverulent sodium silicate according to b) into an obliquely arranged rotary kiln being fitted with devices for moving solids, said rotary kiln showing a low heat transfer through its wall because of its good insulation causing an outside wall temperature of the rotary kiln of less than 60° C. with the resultant counteraction to the sticking tendency of the sodium silicate, and treating said pulverulent sodium silicate in said rotary kiln with flue gas in counter-current at temperatures from 250° to 500° C. for 1 to 60 minutes,
   d) exhausting the exit gas from the rotary kiln in the central region thereof and in the region of the end where the pulverulent amorphous sodium silicate having a water content of 15 to 23% by weight is introduced, purifying said exit gas by means of a dry dust filter, and admixing the sodium silicate taken from the dry dust filter, and admixing the sodium silicate taken from the dry dust filter to the pulverulent amorphous sodium silicate destined to be introduced into the rotary kiln with the resultant increase of the throughput of sodium silicate through the rotary kiln per unit of time,
   e) communiting the amorphous sodium silicate emerging from the rotary kiln by means of a mechanical crusher to grain sizes of 0.1 to 12 mm, and
   f) grinding the comminuted sodium silicate by means of a mill to grain sizes of 2 to 400 μm.

2. The process as claimed in claim 1, wherein a mechanical mill running at a circumferential speed of 0.5 to 60 m/s is used.

3. The process as claimed in claim 1, wherein an air jet mill is used.

4. The process as claimed in claim 1, wherein a ceramically lined ball mill is used.

5. The process as claimed in claim 1, wherein a ceramically lined vibratory mill is used.

6. The process as claimed in claim 1, wherein the ground sodium silicate is fed to a roll compactor, by means of which it is compressed at a roll-pressing force of 20 to 40 kN/cm of roll width to give compact pieces.

7. The process as claimed in claim 6, wherein the compact pieces are, after pre-comminution by forcing them through screens, processed to give granules having a bulk density of 700 to 1000 g/l.

8. The process as claimed in claim 1, wherein amorphous sodium silicates having a water content of 0.5 to 2% by weight are produced.

* * * * *